Routt & Keeton,
Excavator.
No. 112,287. Patented Feb. 28, 1871.
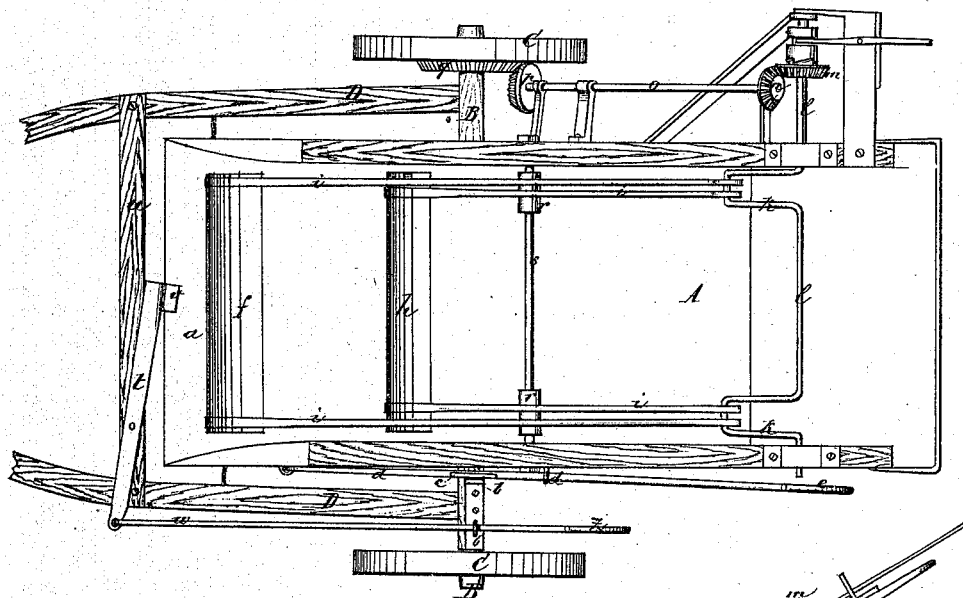
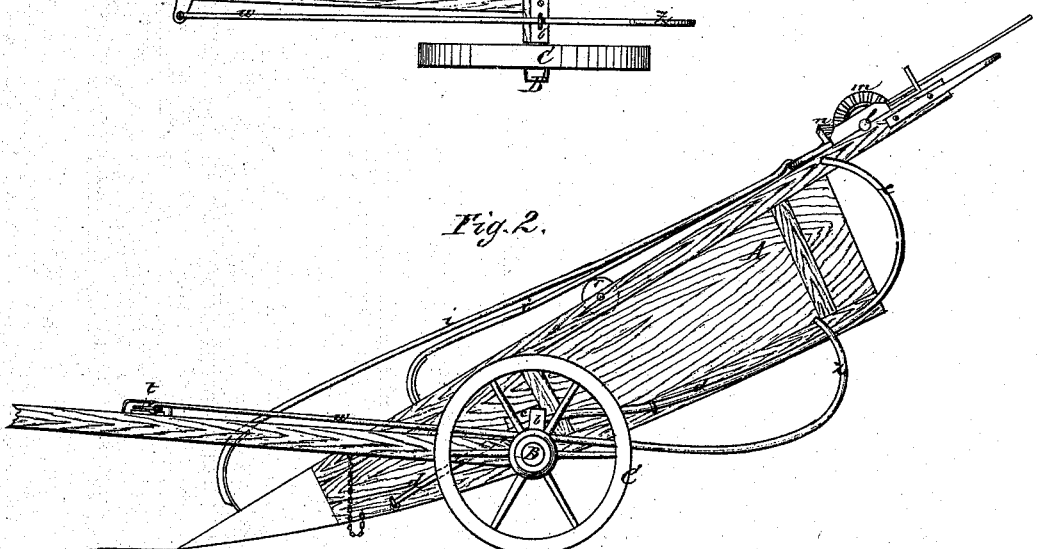

United States Patent Office.

ANSELL P. ROUTT AND JOHN J. KEETON, OF LIBERTY MILLS, VIRGINIA.

Letters Patent No. 112,287, dated February 28, 1871.

IMPROVEMENT IN SELF-LOADING SCRAPERS.

The Schedule referred to in these Letters Patent and making part of the same.

*To all whom it may concern:*

Be it known that we, ANSELL P. ROUTT and JOHN J. KEETON, of Liberty Mills, in the county of Orange and State of Virginia, have invented a new and improved Self-Loading Dumping-Cart; and we do hereby declare the following to be a full, clear, and exact description of the same, reference being had to the accompanying drawing making a part of this specification, in which—

Figure 1 is a plan view, and
Figure 2 is a side elevation.

This invention has for its object to provide, for public use, a light, easily-operated, self-loading and dumping cart, adapted for the general purposes of the farm.

The invention has, however, special reference to an improved arrangement, in connection with such a cart, of hoes or scrapers for hauling the dirt into the cart-body or dumping-shovel, and in the means for holding the shovel in an inclined position during that operation, all as hereinafter fully explained.

Referring to the drawing—
A is the cart-body;
B, the axle upon which it is pivoted;
C, the wheels upon which it is supported; and
D D, the thills by which it is drawn.

On the front end of the cart-body is a scraper, $a$, which, when lowered to the ground and held there, loosens and collects earth.

To hold the cart-body thus inclined I use a fixed arm attached to the axle, and a vibrating arm connected with the body. The fixed arm is lettered $b$ and the vibrating arm $c$.

The latter projects from a rod, $d$, that is mounted in suitable boxes on the outside of the cart-body, and is provided at one end with a handle, $e$, by which the rod $d$ may be vibrated in its boxes, and thus turn the arm $c$ in front of or away from the arm $b$. When the arm $c$ is in front of the arm $b$ the cart-body is held inclined, and when the arm $c$ is turned away from the arm $b$ the cart-body is free to assume a horizontal position or to dump its load.

While the cart-body is thus held inclined, if it is drawn forward, the hoes $f\ h$ are operated and draw the earth cast up by the scraper into the cart. The hoes $f\ h$ rest on the bottom of the cart-body, extending transversely of the same, having teeth at their lower edges.

Each hoe is connected by rods $i$, extending backward, one from each end, with the cranks $k$ of a shaft, $l$, that passes crosswise of the rear of the cart, being mounted in the upper rails of the same.

On that part of the shaft $l$ which projects beyond one side of the cart a bevel-gear, $m$, is fixed.

A bevel-gear, $q$, is secured to the inner side of the adjacent master-wheel C.

The gears $m$ and $q$ are connected by a shaft, $o$, mounted in arms that project from the side of the cart, and bearing bevel-gears $p\ n$ at its ends.

By this means the motion of the master-wheel is communicated to the shaft $l$, and by that to the hoes $f\ h$.

The rods $i$ rest, as they are thrust forward, upon rollers $r$, that are placed upon a rod, $s$, which extends from one side of the cart to the other. The function of the rollers is to keep the hoes elevated while moving forward, and the cranks $k$ are passing through the lowest parts of their revolutions. As the cranks draw toward the horizontal the hoes descend until they strike the bottom of the cart. While the cranks are describing their upper semi-revolutions they draw the hoes back along the bottom of the cart, and thus effect the loading of the same.

A mechanism, which need not be here described, being old, is provided for throwing the gear $m$ out of connection with the gear $n$, so as to render the hoes inoperative when it is unnecessary to use them.

The cart-body may be held in connection with the thills by the following mechanism:

A lever, $t$, pivoted on the upper side of the cross-bar $u$, bears at one end a fork, $v$, and is connected at its other end with a rod, $w$, that passes back through a staple, $x$, on the axle.

The rod $w$ is provided with a handle, $z$, by which it may be moved either forward or backward. The moving of the rod $w$ forward throws the fork $v$ backward, and, if the front end of the cart-body is held at the proper height, the fork embraces the edge of the scraper $a$, and holds the same fast. On moving the rod $w$ backward the fork $v$ is drawn forward, and the cart-body released therefrom.

We are aware of the use of hoes in connection with an excavator or ditching-machine, and lay no claim to such devices, broadly.

Having thus described our invention,

What we claim as new, and desire to secure by Letters Patent, is—

1. The hoes $f\ h$, operating as specified, in connection with the body A of the cart, which is arranged to oscillate on the axle B, substantially as shown and described.

2. The device, composed of the fixed arm or bracket $b$, and the rod $d$, provided with rigid arm $c$ and handle $e$, arranged as specified, in connection with the axle B and body A of the cart, to lock said body in the forwardly-inclined position, as specified.

ANSELL P. ROUTT
JOHN J. KEETON.

Witnesses:
W. T. ROUTT,
H. H. THOMPSON.